(12) United States Patent　　(10) Patent No.: US 12,567,881 B2

Azzi et al.　　(45) Date of Patent: Mar. 3, 2026

(54) ROBUST RADIO FREQUENCY WAVEGUIDE SYSTEM FOR GAS TURBINE ENGINES

(71) Applicant: RTX Corporation, Farmington, CT (US)

(72) Inventors: Sharbel Elias Azzi, Palm Beach Gardens, FL (US); Andre M. Ajami, Henderson, NV (US); Joseph V. Mantese, Ellington, CT (US); Jonathan J. Gilson, West Hartford, CT (US); Coy B. Wood, Ellington, CT (US); William Richard Shaw, Westbrook, CT (US)

(73) Assignee: RTX CORPORATION, Farmington, CT (US)

( * ) Notice: Subject to any disclaimer, the term of this patent is extended or adjusted under 35 U.S.C. 154(b) by 446 days.

(21) Appl. No.: 18/172,295

(22) Filed: Feb. 21, 2023

(65) Prior Publication Data

US 2024/0405800 A1　　Dec. 5, 2024

(51) Int. Cl.
　H04B 3/02　　(2006.01)
　H04B 3/46　　(2015.01)
　H04B 3/52　　(2006.01)
(52) U.S. Cl.
　CPC ................ H04B 3/52 (2013.01); H04B 3/46 (2013.01)
(58) Field of Classification Search
　CPC ..................................... H04B 3/52; H04B 3/46
　See application file for complete search history.

(56) References Cited

U.S. PATENT DOCUMENTS

| | | | | |
|---|---|---|---|---|
| 9,615,269 | B2 * | 4/2017 | Henry | ..................... H04L 47/25 |
| 9,735,833 | B2 * | 8/2017 | Gross | ................... H04W 4/021 |
| 11,277,163 | B2 | 3/2022 | Gilson et al. | |
| 2005/0203711 | A1 * | 9/2005 | Taylor | ...................... H04B 3/56 |
| | | | | 702/59 |
| 2005/0234662 | A1 * | 10/2005 | Niedzwiecki | ........ G01R 35/005 |
| | | | | 702/60 |

(Continued)

FOREIGN PATENT DOCUMENTS

| | | | | |
|---|---|---|---|---|
| WO | WO-2016053572 A1 * | 4/2016 | ............. | G01R 31/58 |
| WO | 2019099276 A1 | 5/2019 | | |

OTHER PUBLICATIONS

International Search Report with Written Opinion issued in International Application No. PCT/US2024/016449; Date of Mailing May 31, 2024 (12 pages).

*Primary Examiner* — Fayyaz Alam

(74) *Attorney, Agent, or Firm* — CANTOR COLBURN LLP

(57) ABSTRACT

An apparatus with a communication system includes a method of operating the communication system. The communication system includes first device at a first location, a radio frequency transceiver at the first device, a waveguide extending between the first device to a second device at a second location, and a processor. The processor is configured to transmit a first radio frequency signal through the waveguide toward the second location, receive a second radio frequency signal in response to the first radio frequency signal, determine a presence of a fault in the waveguide from the second radio frequency signal, and transmit a third radio frequency signal via the radio frequency transceiver outside of the waveguide when the presence of the fault is determined.

17 Claims, 4 Drawing Sheets

(56)        References Cited

U.S. PATENT DOCUMENTS

| | | | |
|---|---|---|---|
| 2016/0100324 A1* | 4/2016 | Henry .................... | G01R 31/08 |
| | | | 370/218 |
| 2018/0289359 A1 | 10/2018 | Heims et al. | |
| 2018/0294838 A1 | 10/2018 | Snyder et al. | |
| 2019/0173525 A1* | 6/2019 | Barzegar ................. | H01Q 1/46 |
| 2022/0124596 A1 | 4/2022 | Schafer et al. | |

* cited by examiner

400

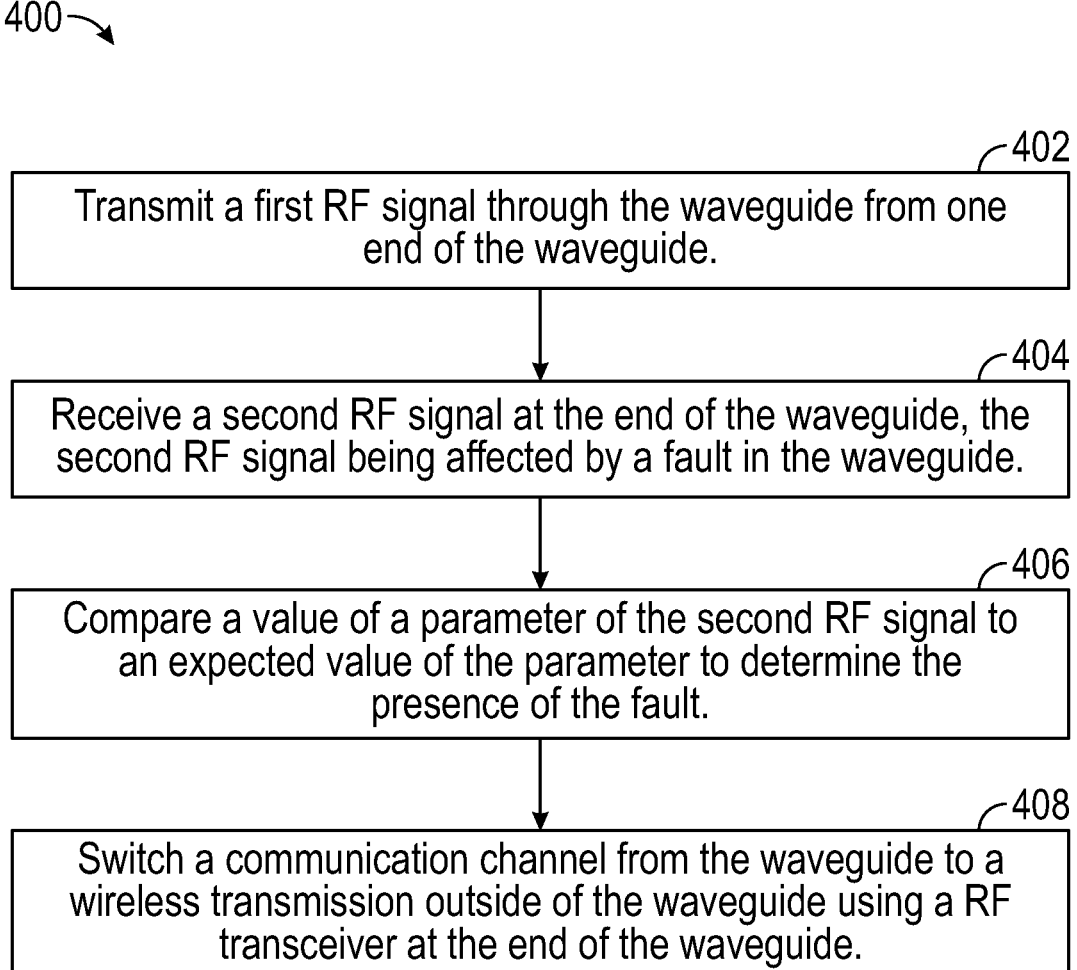

402

Transmit a first RF signal through the waveguide from one end of the waveguide.

404

Receive a second RF signal at the end of the waveguide, the second RF signal being affected by a fault in the waveguide.

406

Compare a value of a parameter of the second RF signal to an expected value of the parameter to determine the presence of the fault.

408

Switch a communication channel from the waveguide to a wireless transmission outside of the waveguide using a RF transceiver at the end of the waveguide.

FIG. 4

ROBUST RADIO FREQUENCY WAVEGUIDE SYSTEM FOR GAS TURBINE ENGINES

BACKGROUND

Exemplary embodiments pertain to the art of radio frequency communication and, more particularly, to a system and method for testing a health of a radio frequency waveguide system.

A machine can include a communication network that sends signals back and to enable operation of the machine. The communication network can include at least one radio frequency waveguide that defines a communication path between a controller at a first location of the machine and a node at a second location of the machine. The node can be a sensor that sends a parameter measurement related to the machine to the controller via a radio frequency (RF) signal transmitted through the waveguide or an actuator that performs an action at the machine when the controller sends an RF signal to it. When the waveguide deteriorates or is impaired, the operation of the machine can suffer. Therefore, there is a need to be able to diagnose a health of the waveguide.

BRIEF DESCRIPTION

The present disclosure provides a method of operating a system. A first radio frequency signal is transmitted from a first device at a first location through a waveguide of the system extending from the first location toward a second device at a second location. A second radio frequency signal is received at the first device in response to the first radio frequency signal. A presence of a fault in the waveguide is determined from the second radio frequency signal. A third radio frequency signal is transmitted from the first device outside of the waveguide when the fault is detected.

In addition to one or more of the features described herein, the method further includes receiving the first radio frequency signal at the second device and transmitting the second radio frequency signal from the second device to the first device.

In addition to one or more of the features described herein, the second radio frequency signal first is a reflection of the first radio frequency signal from at least one of: (i) a third location in the waveguide between the first location and the second location; and (ii) the fault in the waveguide.

In addition to one or more of the features described herein, the method further includes determining the presence of the fault when the second radio frequency signal is received at the first device outside of a selected time window.

In addition to one or more of the features described herein, the method further includes determining the presence of the fault by performing at least one of: (i) comparing an intensity of the second radio frequency signal to an expected intensity; and (ii) comparing a relative intensity of the second radio frequency signal to an expected relative intensity.

In addition to one or more of the features described herein, wherein the second device is in a first branch of the waveguide and a third device is in a second branch of the waveguide, the method further includes communicating from the first device to the second device using the third radio frequency signal when the fault is between the first device and the second device and communicating from the first device to the third device using a signal inside the waveguide.

In addition to one or more of the features described herein, wherein the system includes an aircraft, the method further includes controlling an operation of the aircraft using the third radio frequency signal.

The present disclosure also provides a communication system including a first device at a first location, a radio frequency transceiver at the first device, a waveguide extending between the first device to a second device at second location, and a processor at the first device. The processor is configured to transmit a first radio frequency signal through the waveguide toward the second location, receive a second radio frequency signal in response to the first radio frequency signal, determine a presence of a fault in the waveguide from the second radio frequency signal, and transmit a third radio frequency signal via the radio frequency transceiver outside of the waveguide when the presence of the fault is determined.

In addition to one or more of the features described herein, the second device is configured to receive the first radio frequency signal and transmit the second radio frequency signal to the first device in response to receiving the first radio frequency signal.

In addition to one or more of the features described herein, the second radio frequency signal first is a reflection of the first radio frequency signal from at least one of: (i) a third location in the waveguide between the first location and the second location; and (ii) the fault in the waveguide.

In addition to one or more of the features described herein, the processor is further configured to determine the presence of the fault when the second radio frequency signal is received at the first device outside of a selected time window.

In addition to one or more of the features described herein, the processor is further configured to determine the presence of the fault by performing at least one of: (i) comparing an intensity of the second radio frequency signal to an expected intensity; and (ii) comparing a relative intensity of the second radio frequency signal to an expected relative intensity.

In addition to one or more of the features described herein, the waveguide includes a first branch extending to the second device and a second branch extending to a third device, wherein the processor is further configured to communicate from the first device to the second device using the third radio frequency signal when the fault is between the first device and the second device and communicate from the first device to the third device using a signal inside the waveguide.

In addition to one or more of the features described herein, the communication system is included on an aircraft and the processor is further configured to control an operation of the aircraft using the third radio frequency signal.

The present disclosure also provides an apparatus including a first device at a first location of the apparatus, a second device at a second location of the apparatus, a radio frequency transceiver at the first device, a waveguide extending between the first device to the second device, and a processor. The processor is configured to transmit a first radio frequency signal from the first device through the waveguide toward the second location, receive a second radio frequency signal in response to the first radio frequency signal, determine a presence of a fault in the waveguide from the second radio frequency signal, and transmit a third radio frequency signal via the radio frequency transceiver outside of the waveguide when the presence of the fault is determined.

In addition to one or more of the features described herein, the second device is configured to receive the first radio frequency signal and transmit the second radio frequency signal to the first device in response to receiving the first radio frequency signal.

In addition to one or more of the features described herein, the second radio frequency signal first is a reflection of the first radio frequency signal from at least one of: (i) a third location in the waveguide between the first location and the second location; and (ii) the fault in the waveguide.

In addition to one or more of the features described herein, the processor is further configured to determine the presence of the fault by at least one of: (i) determining the second radio frequency signal to be received at the first device outside of a selected time window; (ii) comparing an intensity of the second radio frequency signal to an expected intensity; and (iii) comparing a relative intensity of the second radio frequency signal to an expected relative intensity.

In addition to one or more of the features described herein, the waveguide includes a first branch extending to the second device and a second branch extending to a third device, wherein the processor is further configured to communicate between the first device and a second device using the third radio frequency signal when the fault is between the first device and the second device and communicate between the first device to the third device using the waveguide.

In addition to one or more of the features described herein, wherein the apparatus includes an aircraft and the processor is further configured to control an operation of the aircraft using the third radio frequency signal.

BRIEF DESCRIPTION OF THE DRAWINGS

The following descriptions should not be considered limiting in any way. With reference to the accompanying drawings, like elements are numbered alike:

FIG. 4 is a flowchart of a method for diagnosing and waveguide of the communication for robust communication.

DETAILED DESCRIPTION

A detailed description of one or more embodiments of the disclosed apparatus and method are presented herein by way of exemplification and not limitation with reference to the Figures.

Figure 1:
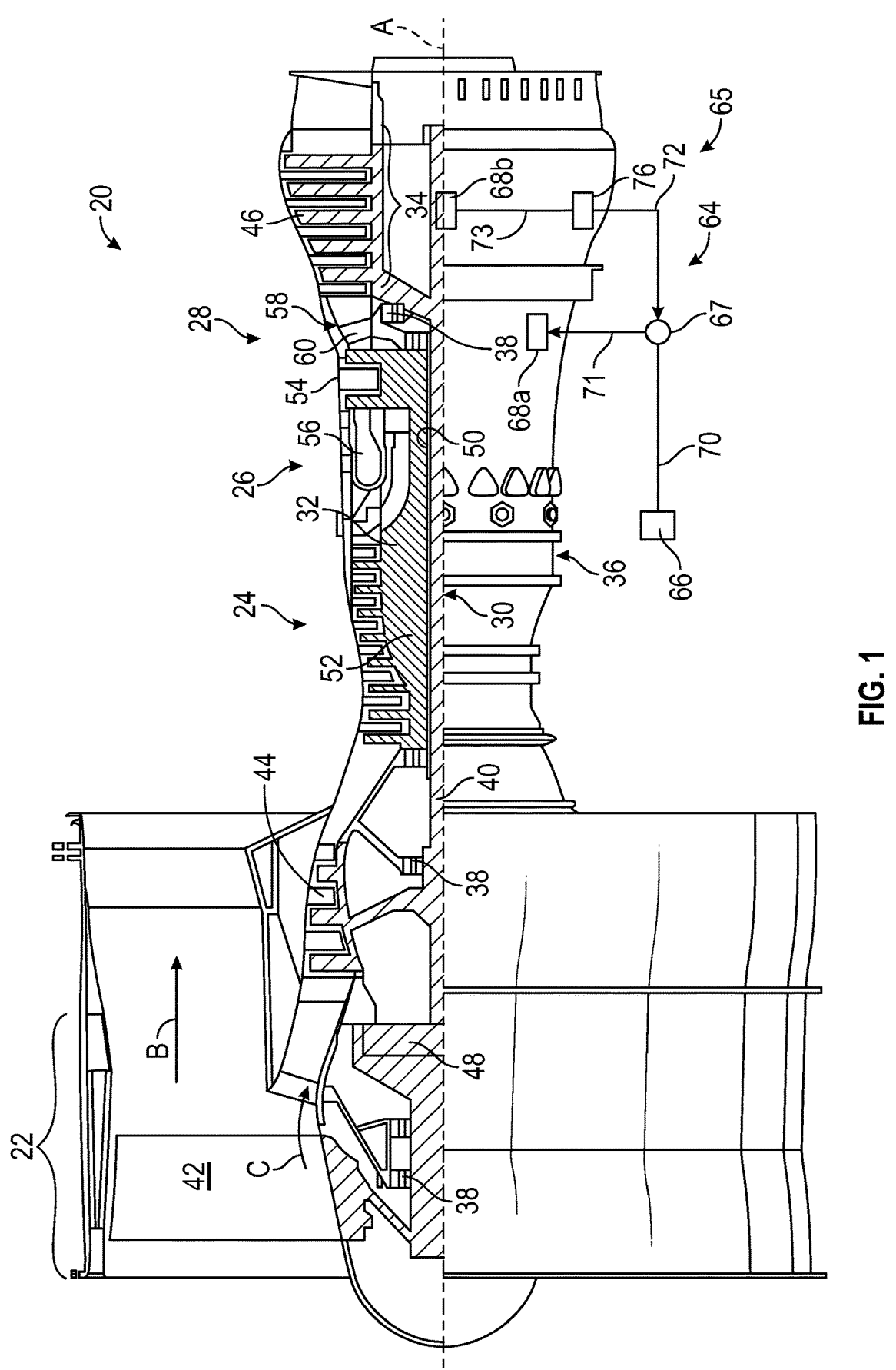
FIG. 1 schematically illustrates a gas turbine engine of an aircraft as one example of a machine as further described herein.

FIG. 1 schematically illustrates a gas turbine engine 20 of an aircraft as one example of a machine as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low-speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low-speed spool 30. The high-speed spool 32 includes an outer shaft 50 that interconnects a second (or high) pressure compressor 52 and a second (or high) pressure turbine 54. A combustor 56 is arranged in exemplary gas turbine engine 20 between the high-pressure compressor 52 and the high-pressure turbine 54. A mid-turbine frame 58 of the engine static structure 36 is arranged generally between the high-pressure turbine 54 and the low-pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low pressure turbine 46. The mid-turbine frame 58 includes airfoils 60 which are in the core airflow path C. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low-pressure turbine 46 as related to the pressure at the outlet of the low-pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low-pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The nodes 68a, 68b can be distributed throughout the gas turbine engine 20 or other such machine. Node 68a is an example of an actuator node that can drive one or more actuators/effectors of the gas turbine engine 20. Node 68b is an example of a sensor node that can interface with one or more sensors of the gas turbine engine 20. Nodes 68a, 68b can include processing support circuitry to transmit/receive electromagnetic signals between sensors or actuators and the controller 66. A coupler 67 can be configured as a splitter between a waveguide 70 coupled to the controller 66 and waveguides 71 and 72 configured to establish wireless communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the radio frequencies (e.g., electromagnetic signals) between the controller 66 and one or more of the nodes 68a, 68b. The transmission media within waveguides 70-73 may include dielectric or gaseous material. In embodiments, the waveguides 70-73 can be hollow metal tubes. The waveguides 70-73 may be rigid or may include flexible material. The disclosed system 64 may be utilized to control and/or monitor any component function or characteristic of a turbomachine, aircraft component operation, and/or other machines.

Exemplary embodiments can use radio frequencies guided by the waveguides 70-73 in a wireless architecture to provide both electromagnetic communication signals and power to the individual elements of the network 65. The use of electromagnetic radiation in the form of radio waves (MHz to GHz) to communicate and power the sensors and actuators vs. using a traditionally complex wired system provides substantial architectural simplification, especially as it pertains to size, weight, and power (SWaP). Embodiments provide extension of a network where reduced SNR may compromise network performance by trading off data rates for an expansion of the number of nodes and distribution lines; thereby providing more nodes/sensors, with greater interconnectivity.

Figure 2:
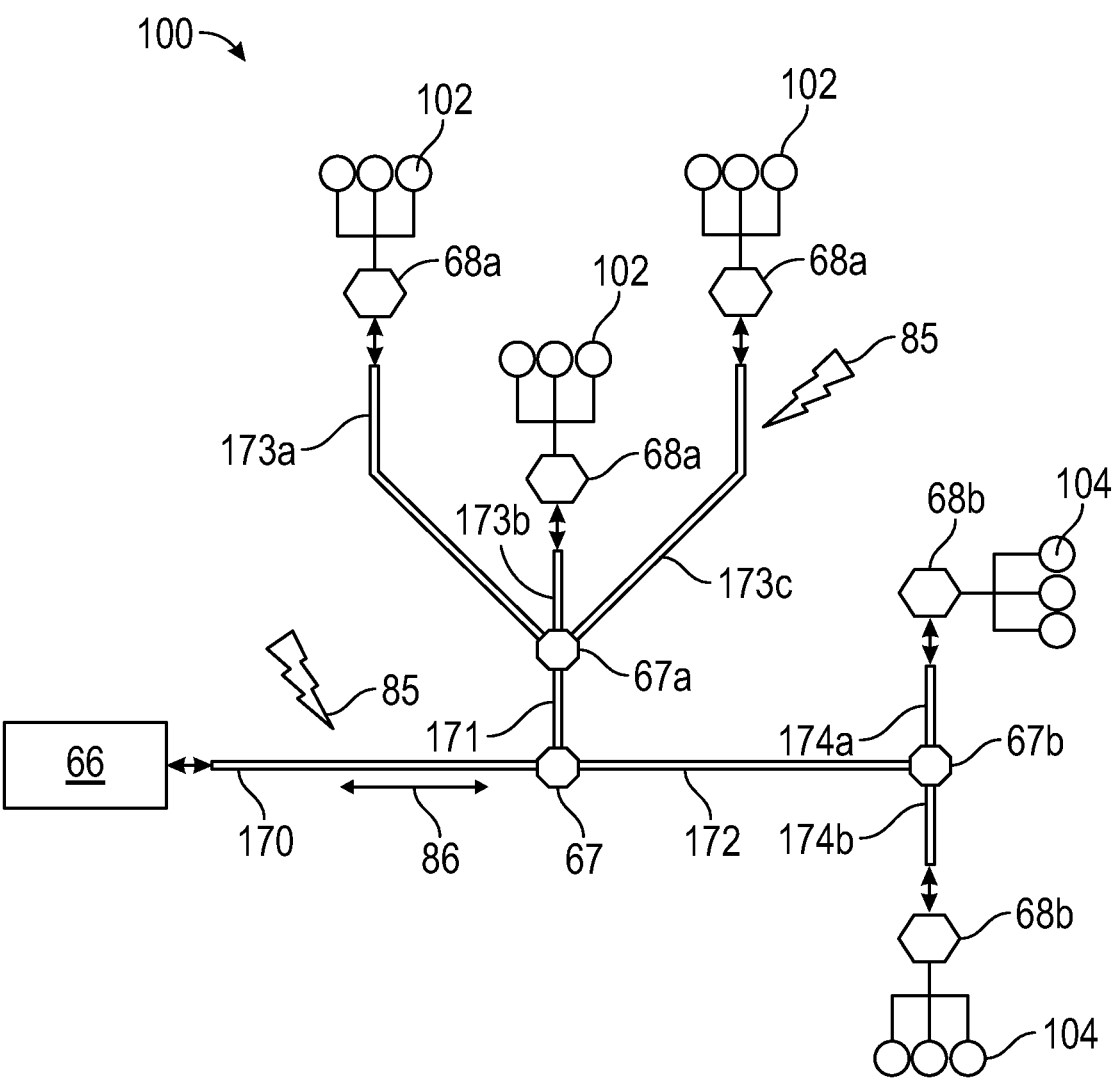
FIG. 2 illustrates a guided electromagnetic transmission network as an example expansion of the network of FIG. 1.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Coupler 67a is further coupled to three nodes 68a through waveguides 173a, 173b, 173c in parallel. Each of the nodes 68a can interface or be combined with multiple actuators 102. Coupler 67b is also coupled to two nodes 68b through waveguides 174a, 174b in parallel. Each of the nodes 68b can interface or be combined with multiple sensors 104.

Although the example of FIG. 2 depicts connections to actuators 102 and sensors 104 isolated to different branches, it will be understood that actuators 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

The example nodes 68a, 68b may include radio-frequency identification devices along with processing, memory and/or the interfaces to connect to conventional sensors or actuators, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and provide unauthorized access to information. In some embodiments, guided electromagnetic radiation is in the range 1-100 GHz. Electromagnetic radiation can be more tightly arranged around specific carrier frequencies, such as 3-4.5 GHZ, 24 GHZ, 60 GHZ, or 76-77 GHz as examples in the microwave spectrum. A carrier frequency can transmit electric power, as well as communicate information, to multiple nodes 68a, 68b using various modulation and signaling techniques.

The nodes 68a with actuators 102 may include control devices, such as a solenoid, switch or other physical actuation devices. Radio frequency identification, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

The guided electromagnetic transmission network 100 may be installed in a mixed temperature environment, such as a machine having a hotter portion and a cooler portion. In reference to the example of FIG. 1, the fan section 22 and compressor section 26 of the gas turbine engine 20 can be designated as cooler portions relative to hotter portions of the gas turbine engine 20, such as the combustor section 26 and turbine section 28. To further accommodate the temperature variations within the gas turbine engine 20, a variety of approaches can be used. As one example, electronics devices within the nodes 68a, 68b, actuators 102, and/or sensors 104 can include wide band gap semiconductor devices, such as silicon carbide or gallium nitride devices supporting higher operating temperatures than typical semiconductor devices. Further, the controller 66 is operable to communicate with the network of nodes 68a, 68b through the two or more radio frequencies using a higher frequency to communicate with one or more of the nodes 68a, 68b in the cooler portion of the machine and a lower frequency to communicate with one or more of the nodes 68a, 68b in the hotter portion of the machine. As an example, communication between the controller 66 and nodes 68a, 68b at the fan section 22 or compressor section 26 of the gas turbine engine 20 may use radio frequencies at or above 1 GHz, while communication to nodes 68a, 68b at the combustor section 26 or turbine section 28 may use frequencies at or below 1 GHz. The radio frequency threshold selected can depend on resultant heating effects that can occur at higher frequencies. Placement of the nodes 68a, 68b can also impact performance capabilities in the hotter portion of the machine. Where actuators 102 or sensors 104 are needed at locations that would potentially exceed the desired operating temperature of the nodes 68a, 68b that directly interface with the actuators 102 or sensors 104, relatively short-wired connections, referred to as "pigtails" can be used between the nodes 68a, 68b and the actuators 102 or sensors 104. The pigtail wiring can provide thermal separation and may support the use of legacy wired actuators 102 and sensors 104 to connect with nodes 68a, 68b. Further temperature accommodations may include cooling systems, heat sinks, and the like.

In some embodiments, shielding in the guided electromagnetic transmission network 100 can be provided such that power and communication signals are shielded from outside interference, which may be caused by environmental electromagnetic or optic interference. Moreover, the shielding limits intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for monitored or controlled components in a guided electromagnetic transmission network. For example, the system 64 can be incorporated in a variety of harsh environment machines, such as manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while enabling additional redundancy. Moreover, additional sensors can be added without the need for additional wiring and physical connections to the controller 66, which may provide for increased system accuracy and response. Embodiments can provide a "plug-n-play" approach to add a new node, potentially without a requalification of the entire system but only the new component; thereby greatly reducing qualification burdens.

Figure 3:
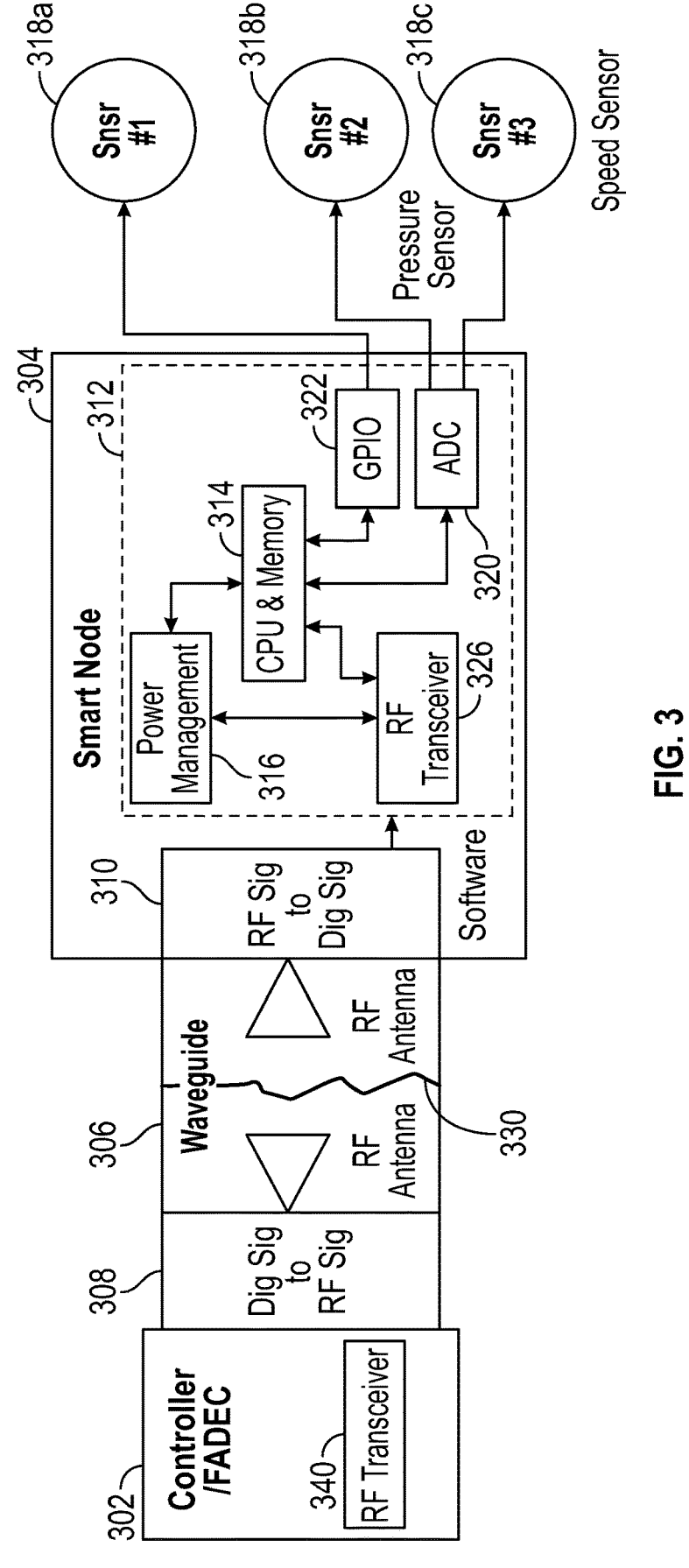
FIG. 3 shows a schematic diagram of a single branch of a communication system of the guided electromagnetic transmission network.

FIG. 3 shows a schematic diagram of a single branch of the communication system. The communication system includes a waveguide that extends from a first device at a first location to a second device at a second location. The single branch includes a controller 302, a smart node 304 and a waveguide 306 extending between the controller 302 at a first end of the waveguide 306 and the smart node 304 at a second end of the waveguide. The controller 302 can be a full authority digital engine control (FADEC), in various embodiments. A first digital-to-RF converter 308 at the controller 302 converts a digital signal at the controller 302 into a radio frequency signal that can be sent along the waveguide 306 and converts a radio frequency signal received from the waveguide into a digital signal that can be used at the controller 302.

The smart node 304 includes a second digital-to-RF converter 310. The second digital-to-RF converter 310 converts a digital signal at the smart node 304 into a radio frequency signal that can be sent along the waveguide 306 and converts a radio frequency signal received from the waveguide 306 into a digital signal that can be used at the smart node 304. In addition, an RF transceiver 340 at the controller 302 can be used to for wireless RF communication outside of the waveguide 306. Similarly the smart node 304 further includes a radio frequency (RF) transceiver 326 for communication of wireless signals outside of the waveguide 306.

The smart node 304 includes a control circuit 312 that includes a processor 314 and power supply 316. The processor 314 perform the various operations of the smart node 304 including generating signals for transmission along the waveguide 306 and communicating with sensors 318a-c. The processor 314 includes logic for switching between communication through the waveguide 306 using the second digital-to-RF converter 310 and communication outside of the waveguide using the RF transceiver 326.

The smart node 304 can be configured to communicate with several sensor types. For example, the smart node 304 can include a general-purpose input output (GPIO) socket 320 for communicating with digital sensors, such as sensor 318a, and/or an analog-to-digital convert (ADC) 322 for communicating with analog sensors, such as sensors 318b and 318c. It is understood that, although three sensors are shown in the illustrative embodiment of FIG. 3, any number of sensors can be in communication with the smart node. It is also to be understood that some or all of the sensors can be replaced with actuators in other embodiments.

A fault 330 is depicted in the waveguide 306 for illustrative purposes. The fault 330 can be a crack or defect in the waveguide 306 that disrupts or impairs a communication signal in the waveguide 306. The controller 302 and/or the smart node 304 can run programs for testing or diagnosing the health of the waveguide 306 and changing a communication mode upon detecting a deterioration in the quality of the waveguide, such as a presence of the fault 330.

In one embodiment for diagnosing the waveguide 306, the controller 302 transmits a first radio frequency signal along the waveguide 306 in the direction of the smart node 304. The controller 302 determines a presence of the fault 330 in the waveguide based on a second radio frequency signal that is received at the controller 302 as a result of the first radio frequency signal. When the fault 330 is detected, the controller 302 can switch to using the RF transceiver 340 to communicate with the transceiver 326 of the smart node 304.

In various embodiments, the second radio frequency signal is a confirmation signal transmitted back to the controller 302 by the smart node 304 upon receiving the first radio frequency signal. Alternatively, the second RF signal can be a signal transmitted by a repeater (not shown) within the waveguide 306 or a reflection of the first RF signal from either the smart node 304 or the repeater or from the fault 330.

The presence of the fault 330 can be determined by comparing a return time (of time-of-light) of the second RF signal at the controller 302 to an expected return time for the second RF signal. A selected time window can be established for receiving the second RF signal after transmitting the first RF signal. When the return time is outside of the time window, the controller 302 can determine that a fault is present in the waveguide or that the waveguide is impaired.

In another embodiment, an intensity of the second signal can be compared to an expected intensity of the second signal to determine a presence of a fault 330. Alternatively, a relative intensity the second signal with respect to the first signal can be compared to an expected relative intensity to determine the presence of the fault 330.

Similarly, the smart node 304 can perform the testing procedures described herein with respect to the controller 302, including transmitted the first RF signal, received a second RF signal, and determining the presence of the fault 330 based on a measured parameters of the second RF signal.

In various embodiments, the waveguide can include a first branch that extends from the controller 302 (first device) at a first location to a second device at a second location and a second branch that extends from the controller 302 to a third device at a third location When the fault is determined to be in the first branch or in a location of the waveguide that impairs communication between the first device and the second device, but does not impair communication between the first device the third device, the controller can use the RF transceiver 340 to communicate with the second device using a third RF signal that is propagated to the second device outside of the waveguide and to communicate with the third node with signals that are propagated inside the waveguide.

FIG. 4 is a flowchart of a method for diagnosing and waveguide of the communication for robust communication. In box 402, a first RF signal is transmitted through the waveguide from one of the controller 302 and the smart node

304. In box 404, a second RF signal is received at the one of the controller 302 and the smart node 304. The second RF signal is affected by a fault in the waveguide. In box 406, a value of a parameter of the second RF signal is compared to an expected value of the parameter to determine the presence of the fault. The parameter can be a time-of flight, intensity, relative intensity, etc. In box 408, the one of the controller 302 and the smart node 304, switches over to communicating using its associated RF transceiver that sends a third radio frequency signal that is a wireless signal that is propagated outside of the waveguide.

While discussed with respect to a gas turbine engine, it is understood that the communication system and method of diagnosis disclosed herein can used in any suitable system, machine, volume, device, apparatus, platform, etc.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an aircraft, comprising:
   transmitting a first radio frequency signal from a first device at a first location through a waveguide of the aircraft extending from the first location toward a second device at a second location;
   receiving a second radio frequency signal at the first device in response to the first radio frequency signal;
   determining a presence of a fault in the waveguide from the second radio frequency signal;
   transmitting a third radio frequency signal from the first device outside of the waveguide when the fault is detected;
   controlling an operation of the aircraft using the third radio frequency signal.

2. The method of claim 1, further comprising receiving the first radio frequency signal at the second device and transmitting the second radio frequency signal from the second device to the first device.

3. The method of claim 1, wherein the second radio frequency signal first is a reflection of the first radio frequency signal from at least one of: (i) a third location in the waveguide between the first location and the second location; and (ii) the fault in the waveguide.

4. The method of claim 1, further comprising determining the presence of the fault when the second radio frequency signal is received at the first device outside of a selected time window.

5. The method of claim 1, further comprising determining the presence of the fault by performing at least one of: (i) comparing an intensity of the second radio frequency signal to an expected intensity; and (ii) comparing a relative intensity of the second radio frequency signal to an expected relative intensity.

6. The method of claim 1, wherein the second device is in a first branch of the waveguide and a third device is in a second branch of the waveguide, further comprising communicating from the first device to the second device using the third radio frequency signal when the fault is between the first device and the second device and communicating from the first device to the third device using a signal inside the waveguide.

7. A communication system of an aircraft, comprising:
a first device at a first location;
a radio frequency transceiver at the first device;
a waveguide extending between the first device to a second device at second location;
a processor at the first device, the processor configured to:
transmit a first radio frequency signal through the waveguide toward the second location;
receive a second radio frequency signal in response to the first radio frequency signal;
determine a presence of a fault in the waveguide from the second radio frequency signal;
transmit a third radio frequency signal via the radio frequency transceiver outside of the waveguide when the presence of the fault is determined;
control an operation of the aircraft using the third radio frequency signal.

8. The communication system of claim 7, wherein the second device is configured to receive the first radio frequency signal and transmit the second radio frequency signal to the first device in response to receiving the first radio frequency signal.

9. The communication system of claim 7, wherein the second radio frequency signal first is a reflection of the first radio frequency signal from at least one of: (i) a third location in the waveguide between the first location and the second location; and (ii) the fault in the waveguide.

10. The communication system of claim 7, wherein the processor is further configured to determine the presence of the fault when the second radio frequency signal is received at the first device outside of a selected time window.

11. The communication system of claim 7, wherein the processor is further configured to determine the presence of the fault by performing at least one of: (i) comparing an intensity of the second radio frequency signal to an expected intensity; and (ii) comparing a relative intensity of the second radio frequency signal to an expected relative intensity.

12. The communication system of claim 7, wherein the waveguide includes a first branch extending to the second device and a second branch extending to a third device, wherein the processor is further configured to communicate from the first device to the second device using the third radio frequency signal when the fault is between the first device and the second device and communicate from the first device to the third device using a signal inside the waveguide.

13. An aircraft, comprising:
a first device at a first location of the aircraft;
a second device at a second location of the aircraft;
a radio frequency transceiver at the first device;
a waveguide extending between the first device to the second device;
a processor configured to:
transmit a first radio frequency signal from the first device through the waveguide toward the second location;
receive a second radio frequency signal in response to the first radio frequency signal;
determine a presence of a fault in the waveguide from the second radio frequency signal;
transmit a third radio frequency signal via the radio frequency transceiver outside of the waveguide when the presence of the fault is determined;
control an operation of the aircraft using the third radio frequency signal.

14. The aircraft of claim 13, wherein the second device is configured to receive the first radio frequency signal and transmit the second radio frequency signal to the first device in response to receiving the first radio frequency signal.

15. The aircraft of claim 13, wherein the second radio frequency signal first is a reflection of the first radio frequency signal from at least one of: (i) a third location in the waveguide between the first location and the second location; and (ii) the fault in the waveguide.

16. The aircraft of claim 13, wherein the processor is further configured to determine the presence of the fault by at least one of: (i) determining the second radio frequency signal to be received at the first device outside of a selected time window; (ii) comparing an intensity of the second radio frequency signal to an expected intensity; and (iii) comparing a relative intensity of the second radio frequency signal to an expected relative intensity.

17. The aircraft of claim 13, wherein the waveguide includes a first branch extending to the second device and a second branch extending to a third device, wherein the processor is further configured to communicate between the first device and a second device using the third radio frequency signal when the fault is between the first device and the second device and communicate between the first device to the third device using the waveguide.

* * * * *